(12) United States Patent
Siminoff

(10) Patent No.: US 9,106,746 B2
(45) Date of Patent: Aug. 11, 2015

(54) SYSTEM AND METHOD FOR CONTROLLING CALLS FOR CONTACT CENTERS

(71) Applicant: James Siminoff, Pacific Palisades, CA (US)

(72) Inventor: James Siminoff, Pacific Palisades, CA (US)

(*) Notice: Subject to any disclaimer, the term of this patent is extended or adjusted under 35 U.S.C. 154(b) by 0 days.

(21) Appl. No.: 14/011,065

(22) Filed: Aug. 27, 2013

(65) Prior Publication Data

US 2015/0063559 A1  Mar. 5, 2015

(51) Int. Cl.
  *H04M 3/00* (2006.01)
  *H04M 1/24* (2006.01)
  *H04M 3/51* (2006.01)
  *H04M 3/523* (2006.01)

(52) U.S. Cl.
  CPC .......... *H04M 3/5158* (2013.01); *H04M 3/5232* (2013.01)

(58) Field of Classification Search
  CPC ... H04M 3/51; H04M 3/5183; H04M 3/5158; H04M 3/5232
  USPC ............... 379/32.01, 142.07, 266.01, 266.07, 379/266.08, 266.1
  See application file for complete search history.

(56) References Cited

U.S. PATENT DOCUMENTS

| | | | |
|---|---|---|---|
| 2005/0226403 A1* | 10/2005 | Lenard | 379/266.07 |
| 2008/0075251 A1* | 3/2008 | Jefferson et al. | 379/142.07 |
| 2008/0159521 A1* | 7/2008 | Sneyders et al. | 379/266.07 |
| 2011/0044431 A1* | 2/2011 | Klemm | 379/32.01 |
| 2012/0106729 A1* | 5/2012 | Carter et al. | 379/265.02 |
| 2014/0289005 A1* | 9/2014 | Laing et al. | 705/7.31 |

* cited by examiner

*Primary Examiner* — Quoc D Tran
(74) *Attorney, Agent, or Firm* — White and Williams LLP

(57) ABSTRACT

A computer system for controlling calls to a call target, including a processor in communication with non-volatile memory, the non-volatile memory executing code including code for receiving call target information relating to the call target, code for accessing a database and retrieving a contact rate for a time period for the call target, code for placing a call target identifier in a queue indicating the call target will be called during the time period, when the time period has a contact rate greater than a threshold rate, code for placing a call to the call target during the time period, and code for updating the contact rate based on an outcome of the call.

15 Claims, 8 Drawing Sheets

Target Party ID Number: 324 - xxx - xxxx

Regulations: No calls before 9:00 am or after 4:00pm

Time Zone: Pacific Time Zone (GMT -8)

Active: Yes

| Time at Target Party | Day 1 Sunday | Day 2 Monday | Day 3 Tuesday | Day 4 Wednesday | Day 5 Thursday | Day 6 Friday | Day 7 Saturday |
|---|---|---|---|---|---|---|---|
| Time A 9:00am-10:00am | 9% | 30% | 24% | 17% | 27% | 05% | 0% |
| Time B 10:00am-11:00am | 25% | 53% | 57% | 33% | 63% | 12% | 02% |
| Time C 11:00am-12:00pm | 3% | 24% | 30% | 32% | 30% | 23% | 16% |
| Time D 12:00pm-1:00pm | 0% | 15% | 56% | 44% | 20% | 43% | 18% |
| Time E 1:00pm-2:00pm | 0% | 30% | 25% | 26% | 28% | 88% | 23% |
| Time F 2:00pm-3:00pm | 6% | 36% | 39% | 37% | 39% | 50% | 14% |
| Time G 3:00pm-4:00pm | 20% | 24% | 11% | 17% | 19% | 31% | 28% |

FIG. 6

Target Party ID Number: 324 - xxx - xxxx

Regulations: No calls before 9:00 am or after 4:00pm

Time Zone: Pacific Time Zone (GMT -8)

Active: Yes

| Time at Target Party | Day 1 Sunday | Day 2 Monday | Day 3 Tuesday | Day 4 Wednesday | Day 5 Thursday | Day 6 Friday | Day 7 Saturday |
|---|---|---|---|---|---|---|---|
| Time A 9:00am- 10:00am | 9% | 30% | 24% | 17% | 27% | 05% | 0% |
| Time B 10:00am- 11:00am | 25% | 53% | 57% | 33% | 63% | 12% | 02% |
| Time C 11:00am- 12:00pm | 3% | 24% | 30% | 32% | 30% | 23% | 16% |
| Time D 12:00pm- 1:00pm | 0% | 15% | 56% | 44% | 20% | 43% | 18% |
| Time E 1:00pm- 2:00pm | 0% | 30% | 25% | 26% | 28% | 88% | 23% |
| Time F 2:00pm- 3:00pm | 6% | 36% | 39% | 37% | 39% | 50% | 14% |
| Time G 3:00pm- 4:00pm | 20% | 24% | 11% | 17% | 19% | 31% | 28% |

FIG. 7

DAY 2
MONDAY

TIME B
10:00 am - 11:00 am

Successful: 45 Connected
+16 (.5) Busy Signals
Successful: 53 Attempts

Failed Attempts = 39 Attempts

Total Attempts = 45 Connected + 16 Busy + 39 Failed
= 100 Attempts $$\frac{\text{successful: 53}}{\text{total attempts:100}} = 53\%$$

↓

53% ≥ 33%? = YES

↓

SUCCESSFUL

SYSTEM AND METHOD FOR CONTROLLING CALLS FOR CONTACT CENTERS

BACKGROUND OF THE INVENTION

In certain forms of communication, for example, during traditional telephone calling, the party initiating the communication (Originating Party) may not know whether the target (Target Party) will accept the invitation to connect and thus create a two-way communication. This lack of prior knowledge leads to a lack of efficiency for the Originating Party. The ability to predict, with some certainty, the best time to attempt to make a connection with the Target Party would be beneficial to the Originating Party, especially when the Originating Party is a telemarketer making hundreds or thousands of calls each day. More accurate predictions would result in Originating Parties having more time to communicate with Target Parties and less time dialing and seeking a connection. One way to increase the likelihood of contacting a Target Party and thereby increase efficiency is to use knowledge of the Target Party's prior telecommunication history. Such a system may also benefit the Target Party, which would receive fewer calls and may also have fewer missed calls on their phone or answering machines.

SUMMARY OF THE INVENTION

A computer system for controlling calls to a call target, including a processor in communication with non-volatile memory, the non-volatile memory executing code including code for receiving call target information relating to the call target, code for accessing a database and retrieving a contact rate for a time period for the call target, code for placing a call target identifier in a queue indicating the call target will be called during the time period, when the time period has a contact rate greater than a threshold rate, code for placing a call to the call target during the time period, and code for updating the contact rate based on an outcome of the call.

BRIEF DESCRIPTION OF THE DRAWINGS

FIG. 6 is an example of a data table according to an aspect of the system and method of the present disclosure.

FIG. 7 is a detailed view of an individual cell within a data table according to an aspect of the system and method of the present disclosure.

DETAILED DESCRIPTION OF THE DRAWINGS

Figure 1:
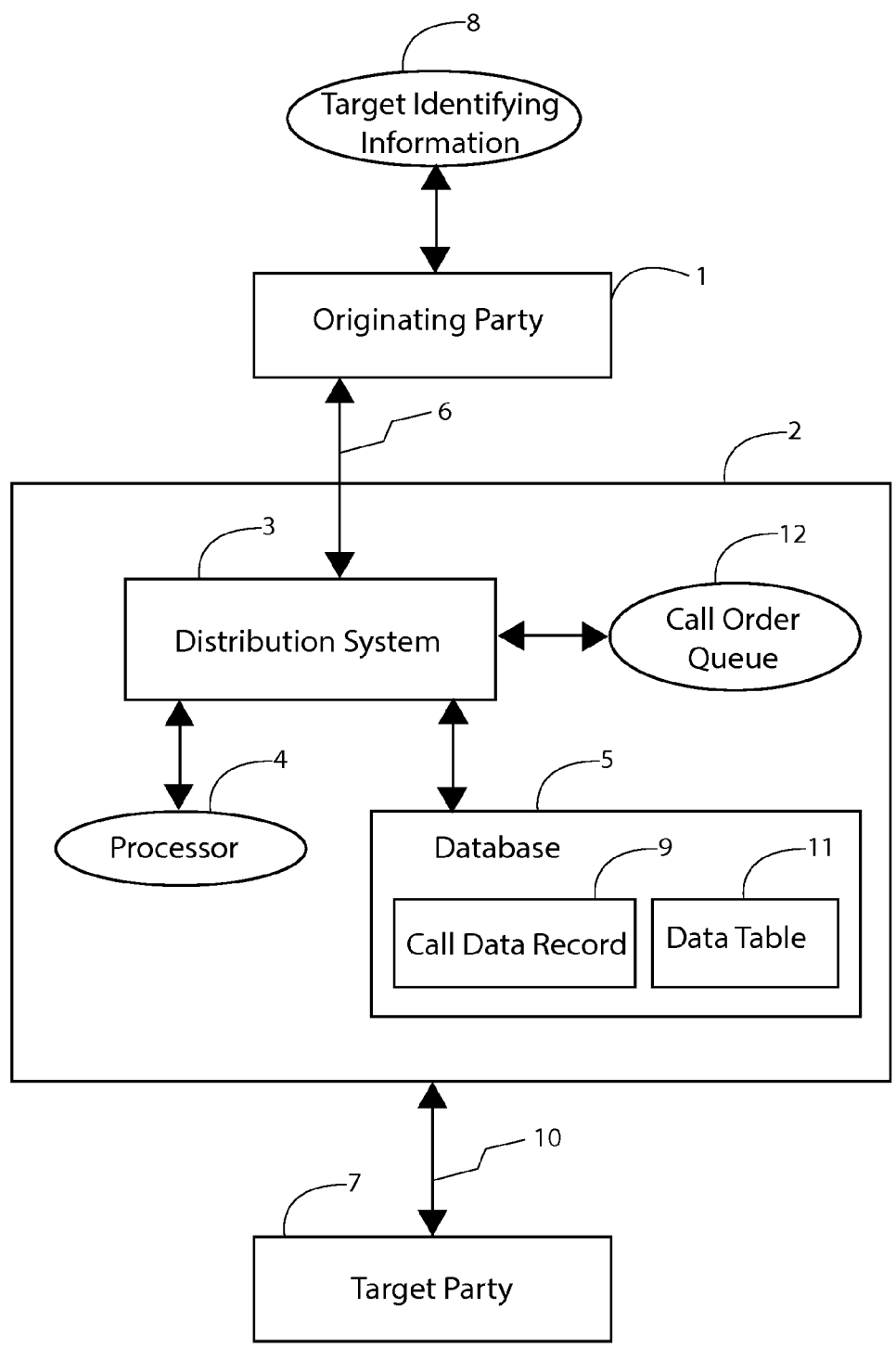
FIG. 1 is a view of an end-to-end telecommunication connection according to an aspect of the system and method of the present disclosure.

FIG. 1 is a view of an end-to-end telecommunication connection as would occur during communication between Originating Party 1 (e.g. call center, person or organization) and Target Party 7 (e.g. a person or organization) using Carrier Network 2 (e.g. telecommunication provider). Originating Party 1 may transmit a call including, (e.g. audio and/or data) through Physical/Virtual Connection 6 to Carrier Network 2. Originating Party 1 may transmit Target Identifying Information 8, which may include Target Party 7 telephone number, geographic location, time zone and other information via Physical/Virtual Connection 6 (e.g. phone line, voice T1, voice DS3) to Carrier Network 2 for outbound calls. Other data associated with Target Party 7 may include data provided by a Local Number Portability Database (not shown) and a Mobile Number Portability Database (not shown). The portability databases mentioned above may provide Originating Party 1 and/or Carrier Network 2 with additional information regarding Target Party 7's current and or recent geographic location and the type of phone line associated with Target Party 7 (e.g. landline or cellphone). Target Identifying Information 8 may also include geographic location information for Target Party 7.

Originating Party 1 may transmit Target Identifying Information 8 via Physical/Virtual Connection 6 to Carrier Network 2 to determine if there is data associated with Target Party 7. Processor 4 scans Database 9 for a CDR 9 associated with Target Party 7. CDR 9 is a data record that may contain information related to a telephone call, such as the origination and destination addresses of the call, the time the call started and ended, the duration. of the call, language spoken by Target Party 7, the time of day the call was made and any toll charges that were added through the network or charges for operator services, among other details of the call.

Carrier Network 2 may route the call and pertinent data such as the Target Identifying Information 8 and number portability data to Distribution System 3, which may operate within or may be connected to Carrier Network 2. Distribution System 3 may be a circuit switch, softswitch, or other routing intelligent system that connects telephone calls from one phone line to another, in this case, from Originating Party 1 to Target Party 7. Processor 4 may operate within or may be connected to Distribution System 3. Processor 4 processes and interprets the data provided within Target Identifying Information 8 and number portability data, which may have been sent to Distribution System 3 or directly to Processor 4 from Originating Party 1 via Physical/Virtual Connection 6.

With the data from Target Identifying Information 8, Processor 4 determines if there is information regarding Target Party 7 within Database 5. If said data exists, such as data found in CDR 9, the data is utilized to create Data Tables 11 to associate with Target Party 7. Data from CDR 9 may include times throughout each day that the Target Party 7 is likely and/or not likely to answer the call sent from Originating Party 1. In one non-limiting aspect, Data Table 11 may include an ordered arrangement of rows and columns of data indicating preferred and/or non-preferred times (e.g. hours, half hours, segmented portions of time throughout a standard day, day time, night time) to call Target Party 7 throughout the course of a day or a number of days (e.g. day of week, weekdays, weekends, day of month, week of month, week of year, month, season, or year). Data Tables 11 created by Processor 4 are stored within Database 5, which may operate within or may be connected to Carrier Network 2. Database 5 may contain CDR 9 associated with one or more Target Parties 7 and Data Tables 11 created by Processor 4, which may be associated with one or more Target Parties 7. Database 5 may be stored in a computer, server, database, flash memory or other computing storage device. Distribution System 3 may communicate with a database, such as Database 5 and may create a Call Order Queue 12 based on data found within Data Table 11. As described in further detail in FIG. 4, Call Order Queue 12 may be a script generated by Distribution System 3 as a result of scanning the Data Tables 11 for an efficient order to execute calls to Target Party 7. Call Order Queue 12 may contain scheduled times to contact one Target Party 7 or multiple Target Parties 7 and may span different lengths of time (e.g. hours, days, weeks, months, years, decades).

In one aspect of the present disclosure, the processes and entities described within the Carrier Network 2 such as the data processing performed by Processor 4, the storing of Data Tables 11 and CDR 9 within Database 5, Call Order Queue 12 and the Distribution System 3 may be located within the Originating Party's 1 Private Branch Exchange (e.g. corporate phone system, predictive dialer, call distribution system) or may be attached to or embedded within Originating Party's 1 communication device (e.g. telephone, VoIP phone, VoIP softphone). In this aspect, Originating Party 1 may transmit the Target Identifying Information 8, including Target Party 7 telephone number and other information via Physical/Virtual Connection 6 to Carrier Network 2 for outbound calls, along with a Call Order Queue 12 to instruct Carrier Network 2 when to contact each Target Party 7.

Carrier Network 2 may connect to Target Party 7 via Physical/Virtual Connection 10 once Processor 4 has compared data from Target Identifying Information 8 with CDR 9 in Database 5 and processed said data into Data Table 11. Data within Data Table 11 is then processed into a script, such as Call Order Queue 12 and distributed by Distribution System 3. Carrier Network 2 routes calls to Target Party 7 via the Physical/Virtual Connection 10 and bridges Originating Party 1 with Target Party 7. Prior to or after the connection between Originating Party 1 and Target Party 7, Target Party 7 may communicate ISDN cause codes back to Originating Party 1. An ISDN cause code will indicate an ISDN-specific error or indicate current ISDN activity. In one aspect of the present disclosure, Originating Party 1 or Carrier Network 2 may acquire data associated with Target Party 7 via online presence, such as availability or appearance on social media websites (e.g. Facebook, Twitter, Foursquare).

Figure 2:
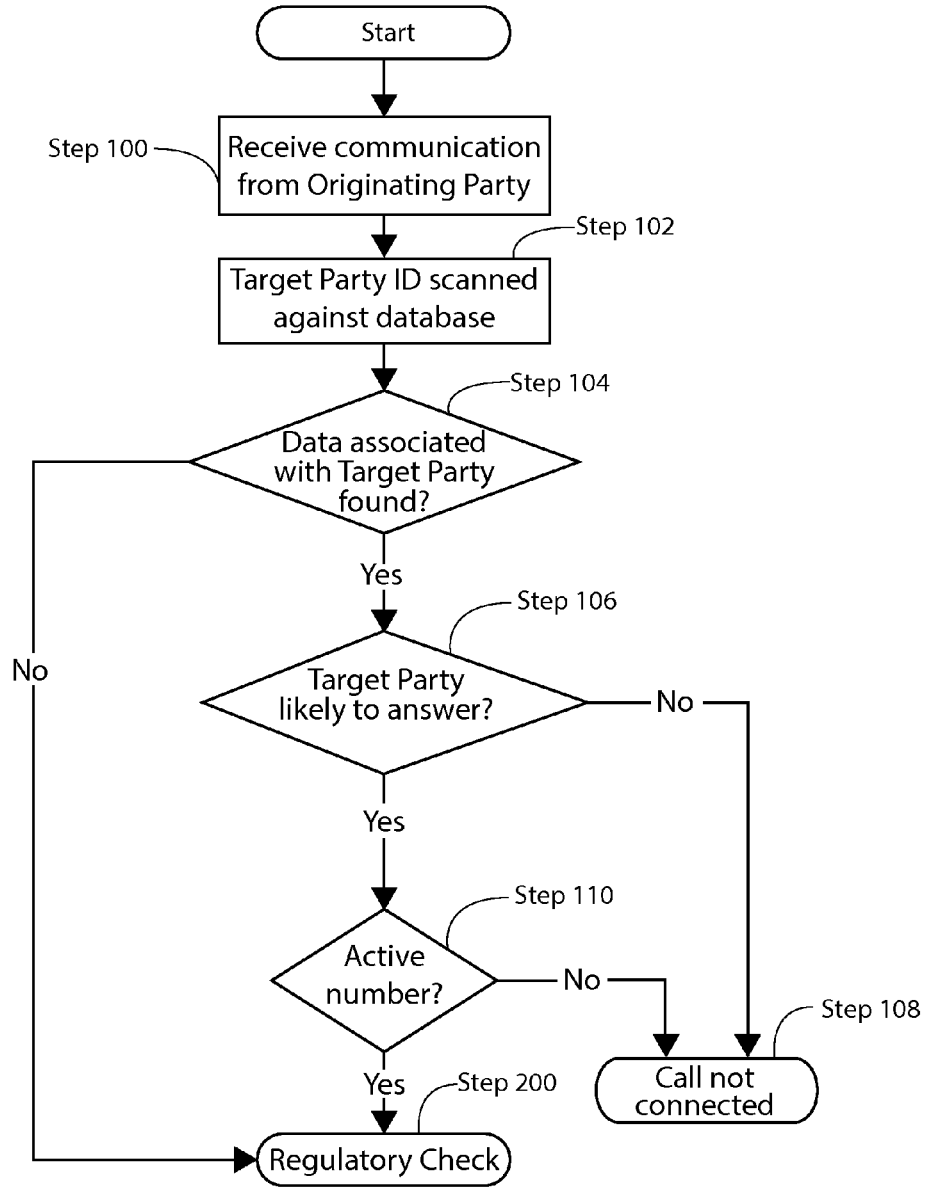
FIG. 2 is a process flow of a communication beginning with Originating Party up to a regulatory check according to an aspect of the system and method of present disclosure.

FIG. 2 shows the process flow where in Step 100 a communication is received by Carrier Network 2 from Originating Party 1. In one aspect, the system of the present disclosure may receive Target Identifying Information 8 and number portability data associated with Target Party 7 from Originating Party 1, unless already stored within Database 5. As described above, Target Identifying Information 8 may include the area code, telephone number and geographic location of Target Party 7, and number portability data provides insights into whether the number has switched carriers and whether it is a landline or cellphone. Based on the number portability data Target Party 7's geographic location may be determined.

In Step 102, the system may access Database 5, CDR 9 and Data Tables 11, which may operate within or may be connected to Carrier Network 2, for information relating to or matching the Target Identifying Information 8 and associated with Target Party 7. The CDR 9 provides Originating Party 1 and Carrier Network 2 with information regarding the likelihood of Target Party 7 answering an outbound call, such as prior history of answered calls, busy signaled calls, missed calls, calls that go to voicemail/answering machines, duration of the calls, and what times throughout each day all of these types of results occur. If data associated with Target Identifying Information 8 and Target Party 7 are found within CDR 9 and Database 5, (Yes, Step 104), Processor 4 determines if Target Party 7 is likely to answer the call from Originating Party 1 at the current time or a specified time in the future at Step 106.

If data associated with Target Identifying Information 8 and Target Party 7 are not found within CDR 9 and Database 5, (No, Step 104), Processor 4 performs a regulatory check, as described below in Step 200, further described in FIG. 3, to ensure Originating Party 1 is not violating regulations prior to connecting the call.

At Step 106, Processor 4 scans Data Table(s) 11 associated with Target Party 7 to determine if Target Party 7 is likely to answer the call at the current time, or a specified time in the future. Data Tables 11 may display cells containing information regarding the likelihood of Target Party 7 answer calls during designated blocks of time. If Target Party 7 is likely to answer the call from Originating Party 1, (Yes, Step 106) Processor 4 determines whether the phone number that will be dialed and associated with Target Party 7 is an active number at Step 110. If Target Party 7 is not likely to answer the call from Originating Party 1, (No, Step 106) Distribution System 3 does not attempt to connect Originating Party 1 to Target Party 7 at Step 108.

At Step 110, Processor 4 determines whether the phone number that will be dialed and associated with Target Party 7 is an active number. Processor 4 scans Database 5 for any prior information or calls associated with the said phone number and Target Party 7. After each attempt to call Target Party 7, Processor 4 logs the ISDN cause code generated while connecting the call. Active numbers generate specific ISDN cause codes (e.g. Cause No. 17—user busy, Cause No. 19—no answer from user) indicating the line is still operated by and associated to Target Party 7. Inactive numbers generate specific ISDN cause codes (e.g. Cause No. 1—unallocated number, Cause No. 22—number changed) indicating Originating Party 1 either dialed the wrong number or Target Party 7 changed their phone number. If Database 5 indicates the phone number has generated an ISDN cause code associated with an active line, or there is no prior information in Database 5 regarding ISDN cause codes emitted while attempting to Target Party 7 during past calls, (Yes, Step 110), Processor 4 performs a regulatory check, as described below in connection with FIG. 3, to ensure Originating Party 1 is not violating regulations in Step 200 prior to connecting the call at Step 216 in FIG. 3.

If the number is inactive, (No, Step 110), then the Distribution System 3 does not attempt to connect Originating Party 1 to Target Party 7 at Step 108. Processor 4 may also store the information regarding the inactive line associated with Target Party 7 within the Data Table 11 associated with Target Party 7 at Step 108.

The method and system of present disclosure may be affected by a variety of rules and regulations that protect the privacy and rights of the Target Party 7. As a result, some of these limitations potentially may lower the successful contact rates of Originating Party 1. Rules stated in the Telephone Consumer Protection Act of 1991 and the Federal Trade Commission's Telemarketing Sales Rule, relevant to this application are listed and described below.

As stated within the Telemarketing Sales Rule, telemarketers may not contact Target Parties 7 between certain hours of a weekday or weekend. Telemarketers may also not contact Target Parties 7 listed on the Federal Do Not Call Registry. The Federal Do Not Call Registry allows a party to permanently restrict telemarketing calls by registering a phone number. If a telemarketer continues to contact the party three months after registering the party's phone number, the party may issue a complaint with the Federal Do Not Call Registry that could result in a fine, lawsuit, or penalty for Originating Party 1 and or Carrier Network 2. There are some exceptions to this law though. If an "established business relationship" is created between the originating party and the target party prior to the target party registering for the Federal Do Not Call Registry, the originating party may be permitted to contact the target party. As described within the Telemarketing Sales Rule provided by the Federal Trade Commission, "established business relationship" means a relationship between a seller and a consumer based on the consumer's purchase, rental, or lease of the seller's goods or services or a financial transaction between the consumer and seller, within the eighteen (18) months immediately preceding the date of a telemarketing call; or the consumer's inquiry or application regarding a product or service offered by the seller, within the three (3) months immediately preceding the date of a telemarketing call.

Figure 3:
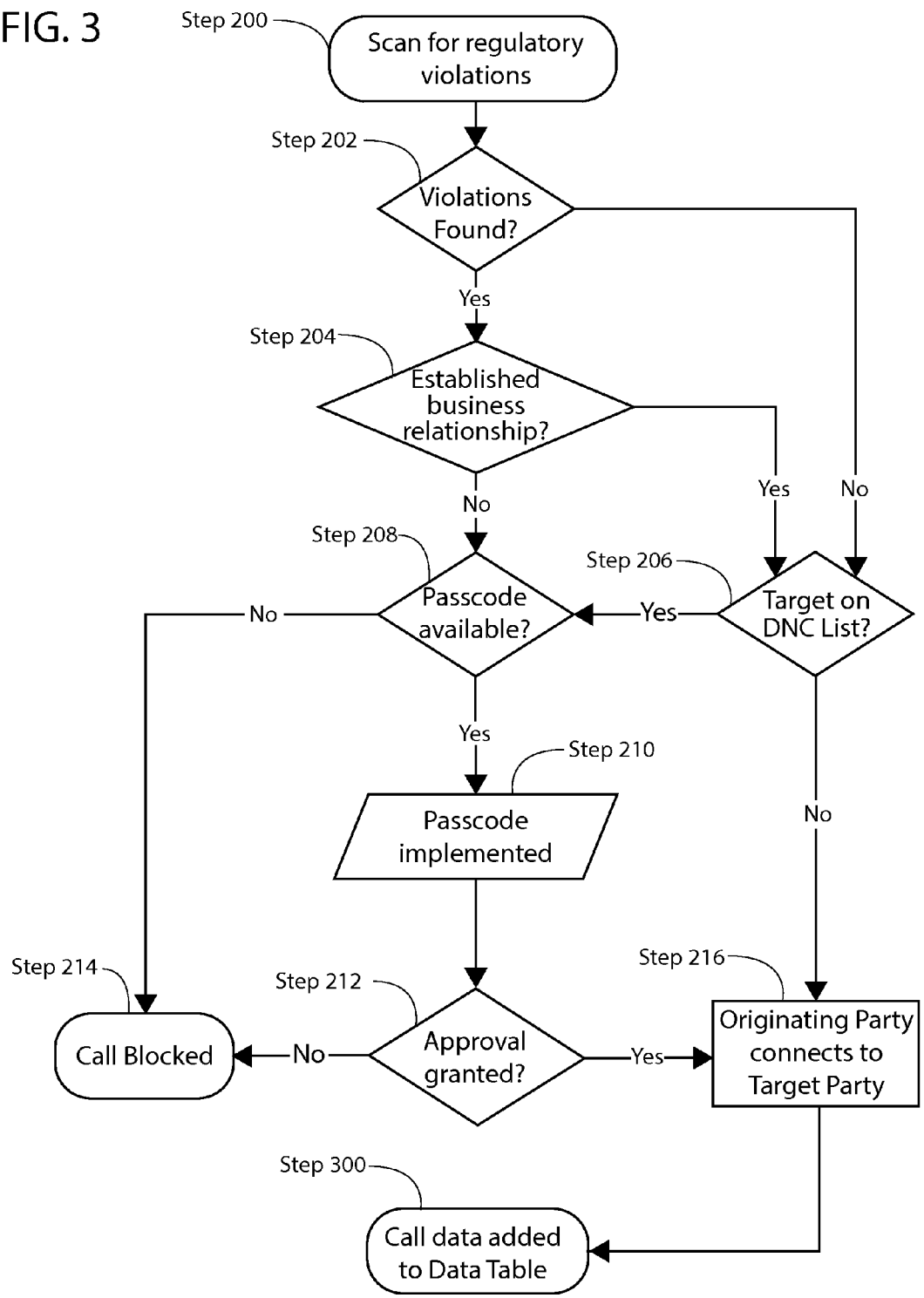
FIG. 3 is a process flow for determining and managing regulatory issues according to an aspect of the system and method of the present disclosure.

As a result of this regulation, Processor 4 may scan the Federal Do Not Call Registry prior to sending a call to Distribution System 3 as shown in FIGS. 2 and 3 to determine if data regarding the Do Not Call List is not within Database 5 and or Data Table 11. If Target Party 7 is registered with the Federal Do Not Call List, then Processor 4 may prevent the number from being dialed, or scan for any data pertaining to a prior "established business relationship" in association with Target Party 7. If a prior "business relationship" is noted within Database 5 or Data Table 11, then the Distribution System 3 may continue to contact Target Party 7 at their discretion.

In conjunction with the rule mentioned above, if at any point in time, regardless of a prior "established business relationship," Target Party 7 may request to be placed on either Originating Party's 1 (a company) or Carrier Network's 2 (Dialer representing said company) do not call list, this request must be processed. Target Party 7 may submit this request over the phone with a human agent or through a key code command built into a pre-recorded message played by Originating Party 1 or Carrier Network 2. Dialers are required to have this key-pressed opt-out mechanism built into every pre-recorded message sent to Target Party 7 when an agent is not available to speak directly with Target Party 7 (known as an abandoned call). If Target Party 7 requests to be placed on an Originating Party's 1 do not call list, Carrier Network 2 may still be permitted to contact Target Party 7, but only when representing a different Originating Party 1 than previously mentioned.

It may be useful for the Carrier Network 2 and Originating Party 1 to gather information in association with Target Party's 7 geographic location. Telemarketers may not engage in outbound telephone calls to a Target Party 7 during "off hours." "Off hours" are clearly defined as any time outside the time frame of 8:00 am to 9:00 pm within the said Target Party's 7 local time zone, unless noted or stated otherwise by the individual Target Party 7. With this regulation built into Processor 4, potential outbound calls directed to Target Party 7 outside the defined time range may be blocked prior to connection by Processor 4 and or Distribution System 3 during Step 402 in FIG. 5, unless noted in the Database 5 that Target Party 7 has approved potential outbound calls directed to Target Party 7. As a result of this regulation, in aspects of the present system and method of present disclosure, Target Identifying Information 8, Call Detail Record 9, and number portability data (not shown) are stored in Database 5 and processed by Processor 4 for accurately determining the current location of Target Party 7. This information could be important for example, if a Target Party 7 has a phone number with an area code associated with New York, but currently lives in California.

Number portability data also helps Processor 4 determine whether the phone number associated with Target Party 7 is a cell phone or a landline telephone. Under the rules stated within the Telemarketers Sales Rules, Originating Party 1 and Carrier Network 2 are not permitted to contact mobile telephones. Processor 4 performs this check, ensuring the number contacted is not directed to a mobile telephone at Step 212 in FIG. 3. The status of a Target Party 7 is updated within the local number portability database, as well in the mobile number portability database. Whenever a Target Party 7 changes the status or characteristics (e.g. change number from landline to mobile, change in network, move from one area code to a location with another area code) of their phone number, it is updated within one or both of the said databases.

As stated in the section above, government agencies have determined that call centers (described herein as Carrier Network 2) making calls must adhere to certain rules and regulations. Those rules include things such as times during which calls may be placed, amount of calls which may be placed in a day, and refraining from calling a number on a "do not call" list. These rules may be managed and implemented within Distribution System 3, as described in further detail in Step 200 in FIG. 2. This system may be attached to or be embedded within Distribution System 3 and may be able to allow Originating Party 1 to modify and add in the specific regulations in which they need to comply with, such as the ones mentioned in the section above. It is to be noted that some of these regulations may not allow for modification. Yet other modifications to these regulations may be made globally, or set dependent on the outbound/inbound caller ID, number dialed, line that the call went out or in on, or an entire customer account.

In one aspect of the system and method of the present disclosure, a system may be within or attached to Carrier Network 2 that blocks calls based on the regulatory issues mentioned above. For example, if a call is about to be made which would break a rule, the system may flag the attempt and stop the connection before it takes place. As shown in FIG. 3 this system may also have a code based system which, with the permission of the Target Party 7, may allow outbound telephone calls to go through to said Target Party 7, even if they would normally be blocked based on regulatory issues. The number of calls blocked and let through to Target Party 7 may fluctuate based on modifications made within the system by Originating Party 1 to loosen and tighten the restrictions.

FIG. 3 displays the process flow that takes place prior to a making a call when regulatory issues are processed. This process is identified as Step 200 in FIG. 2; however it is to be understood by those skilled in the art that this process may take place at any point prior to making a Physical/Virtual Connection 10 with Target Party 7. In Step 200 within FIG. 3, Processor 4 scans for regulatory violations present within the Database 5, such as the local time of day associated to Target Party 7 that Originating Party 1 intends to call Target Party 7, number of times in a day that Originating Party 1 has attempted to call Target Party 7. If any potential violations to any regulations are found or may be triggered upon the connection to Target Party 7, (Yes, Step 202), Processor 4 determines if Originating Party 1 has a prior "established business relationship" with Target Party 7 during Step 204. If no potential or current violations to any regulations are found or may be triggered upon the connection to Target Party 7, (No, Step 202), Processor 4 may determine if Target Party 7 is on any "Do Not Call" Lists during Step 206.

During Step 204 Processor 4 may scan Target Identifying Information 8, CDR 9, and Data Tables 11 to find any information or data associated with a prior "established business relationship". If Target Party 7 has a prior "established business relationship" with Originating Party 1, (Yes, Step 204) Processor 4 may determine if Target Party 7 is on any Do Not Call Lists during Step 206. If no prior "established business relationship" is found between Target Party 7 and Originating Party 1, (No, Step 204) Processor 4 may determine if a passcode is available to implement at Step 208.

During Step 206, Processor 4 may scan the Federal Do Not Call Registry, as well Originating Party 1 and Carrier Network 2's Do Not Call Lists to find Target Party 7 and or Target Identifying Information 8 associated with Target Party 7. If Target Party 7 is not on any of the aforementioned Do Not Call Lists, (No, Step 206) then the Originating Party 1 is connected to Target Party 7 via a Physical/Virtual Connection 10 in Step 216. If Target Party 7 is found on any of the aforementioned Do Not Call Lists, (Yes, Step 206) Processor 4 may determine if a passcode is available to implement at Step 208.

During Step 208, Processor 4 determines if a call may be connected to Target Party 7 using a passcode or PIN. A passcode or PIN may be made available for the Originating Party 1 to utilize, which may grant Originating Party 1 permission to connect the call, regardless of the potential violations. If a passcode cannot be used, (No, Step 208), the call is blocked at Step 214. If a passcode can be used, (Yes, Step 208), Originating Party 1 may input a passcode or pin at Step 210 into Distribution System 3 which may allow for the call to be connected regardless of the potential regulatory violations. In this instance, data regarding prior calls with said Target Party 7, found in CDR 9 and/or Database 5, may be required for approval to be granted at Step 212. Potential data may be a letter, email or voice recording of Target Party 7 on a prior call with Originating Party 1 stating that Originating Party 1 may call Target Party 7 back at a later time in said day, or may call them at a specific time, which may be outside of the standard 8:00 am to 9:00 pm calling window. Other potential data to reference for approval could indicate an "established business relationship" prior to Target Party 7 requesting to be placed on either the Federal Do Not Call List, Originating Party's 1 do not call list or the Carrier Network's 2 do not call list. If any of this data is found by Processor 4, (Yes, Step 212), approval may be granted by Distribution System 3 to connect Originating Party 1 to Target Party 7 via a Physical/Virtual Connection 10 in Step 216. If none of the prior mentioned data is found by Processor 4, (No, Step 212), Distribution System 3 may deny access to Target Party 7 and block the call at Step 214. After Originating Party 1 contacts Target Party 7 via a Physical/Virtual Connection 10 in Step 216, data from the call is added to Data Tables 11 within Database 5 during Step 300.

Figure 4:
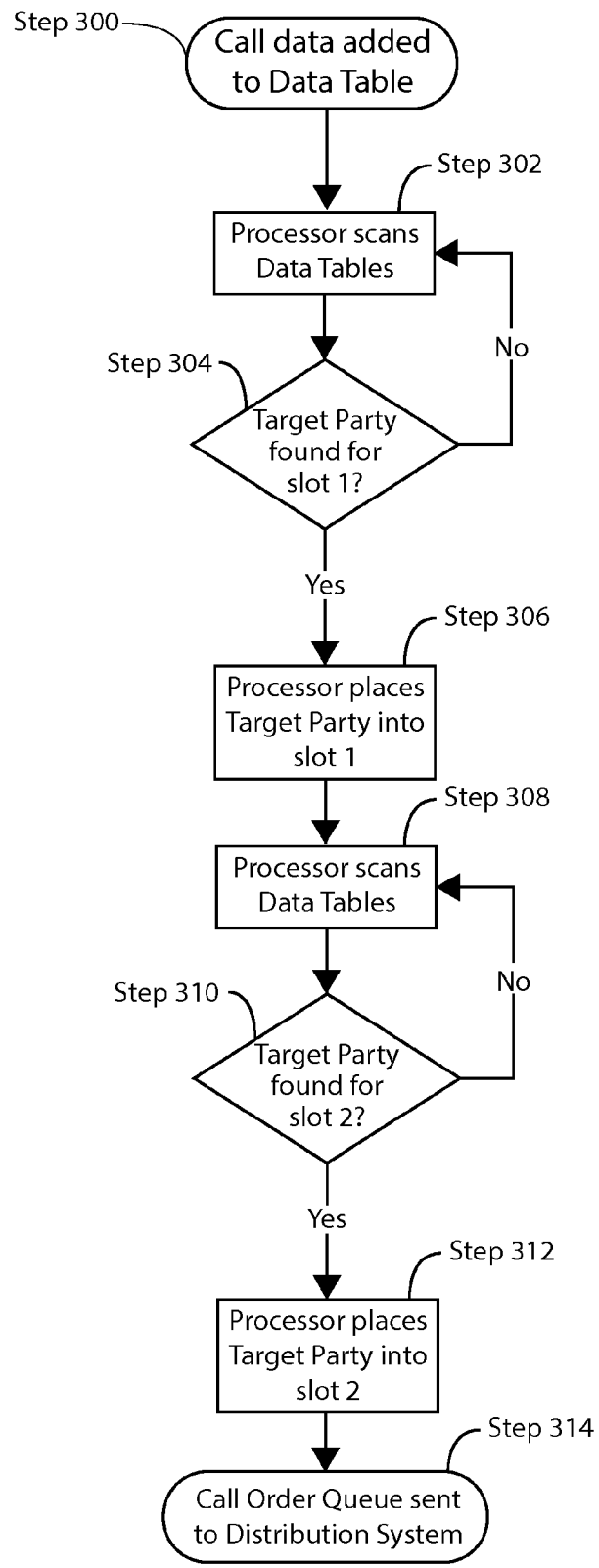
FIG. 4 is a process flow regarding the addition of calls to the Call Order Queue.

FIG. 4 is a process flow describing the steps involved in adding calls to time slots within Call Order Queue 12. In this aspect, Call Order Queue 12 may be a list of empty time slots that may be filled by Processor 4 with scheduled times to contact one or more Target Party 7. Time slots may be a designated portion of time on a specific day (e.g. Day 1; Time A). Processor 4 may scan Data Tables 11 associated with one or more Target Party 7 at Step 302 for cells associated with successful contact rate (e.g. equal to or greater than 33%). Processor 4 may specifically scan for cells within Data Table 11 associated with successful contact rate that match time slot 1 within the empty Call Order Queue 12. If there is a matching cell with successful contact rate within Data Table 11 associated with a Target Party 7 (Yes, Step 304), Processor 4 may schedule a call within Call Order Queue 12 to contact said Target Party 7 during time slot 1 at Step 306. If no matching cell associated with successful contact rate is found by Processor 4 (No, Step 304), Processor 4 may repeat Step 302 until a match is found or the process times out or receives an instruction to end.

Once a call is scheduled within slot 1 between Target Party 7 and Originating Party 1, Processor 4 proceeds to find a Target Party 7 to contact within time slot 2 at Step 308. Processor 4 may scan for cells within Data Table 11 associated with successful contact rate that match time slot 2 within Call Order Queue 12. If there is a matching cell with successful contact rate within Data Table 11 associated with a Target Party 7 (Yes, Step 310), Processor 4 may schedule a call within Call Order Queue 12 to contact said Target Party 7 during time slot 2 at Step 312. If no matching cell associated with successful contact rate is found by Processor 4 (No, Step 310), Processor 4 may repeat Step 308 until a match is found.

As soon as one or more time slots within Call Order Queue 12 are filled, Call Order Queue 12 may be sent to Distribution System 3 to route all the calls to the appropriate Target Party 7 at Step 314. In one non-limiting aspect, Call Order Queue 12 may be coupled to Distribution System 3, and dynamically updated when Processor 4 identifies a new time slot to be filled. It is to be understood by those skilled in the art that the steps and processes involved may continue, depending on the number of time slots that need to be filled.

Although illustrative aspects have been described herein in detail, it should be noted and will be appreciated by those skilled in the art that numerous variations may be made within the flow and processing of data described. In one aspect of the present disclosure, Distribution System 3 may compile Call Order Queue 12 prior to the processes explained in FIG. 2. In this aspect, when Call Order Queue 12 is utilized, Processor 4 may process and interpret data from Database 5 into Data Table 11 prior to any phone connectivity from Originating Party 1 to Target Party 7. In this aspect, Distribution System 3 may create a Call Order Queue 12 based on the interpreted data within Data Table 11. The script may compile an order in which to contact multiple Target Parties 7 based on times in which contact rate percentage may potentially be higher for each Target Party 7. In this non-limiting aspect, if Call Order Queue 12 is generated prior to steps described in FIG. 2.

The use of Call Order Queue 12 may not be necessary to perform to connect Originating Party 1 with Target Party 7. Processor 4 may process data dynamically and Distribution System 3 may dynamically select to dial the Target Party 7 having the highest contact rate percentage at that specified time, rather than generating a Call Order Queue 12 prior to connecting the call at Step 216.

Figure 5:
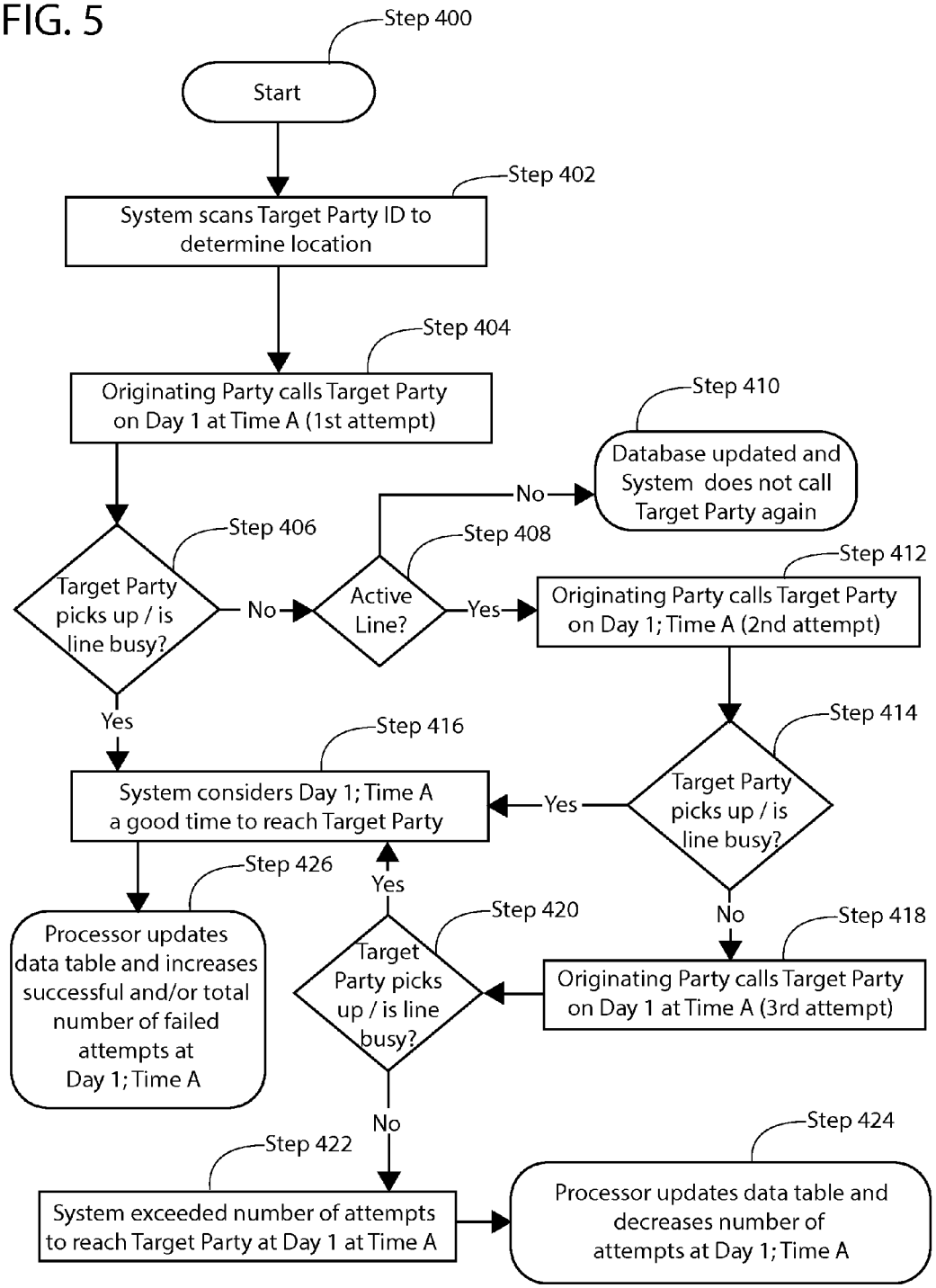
FIG. 5 is a process flow for populating a data table according to an aspect of the system and method of present disclosure.

FIG. 5 is a process flow for populating one or more cells within Data Table 11 according to an aspect of the system and method of present disclosure using Processor 4 to populate Data Table 11. This process flow may be used to populate Data Table 11 during Step 216 of FIG. 3 or after contact with Target Party 7 has been attempted in Step 300 of FIG. 3. The results of the process flow may also be utilized during Step 106 within FIG. 2. In this aspect, data generated by Processor 4 in Data Tables 11 may be used to determine one or more blocks of time when successful contact is likely between Originating Party 1 and Target Party 7. Each time Target Party 7 is contacted, the data gathered from the attempted call may be stored within CDR 9 and the successful contact percentages in Data Table 11 may be updated to reflect recent attempted calls.

For the clarity of this description, the example cell explained herein will be Day 1; Time A, as shown in FIG. 6, where Day 1 may be Sunday and Time A may be 9:00 am to 10:00 am. Although illustrative aspects have been described herein in detail, it should be noted and will be appreciated by those skilled in the art that this process flow may be used to populate other cells within Data Table 11, with columns indicating a single day or possibly a multitude of days (e.g. Monday, Tuesday, week, weekend, weekdays, month, year, seasonal) and rows suggesting times during said day(s) (e.g. hours, half hours, segmented portions of time throughout the standard day, day time, night time).

It should also be understood by those skilled in the art that this process flow may be used to create a new Data Table 11 by compiling dynamic data gathered immediately after Originating Party's 1 attempt to communicate with Target Party 7. This process flow may also be used to process pre-existing data, such as a CDR 9, located within Database 5 and then generating a Data Table 11 for an Originating Party 1 to benefit from.

In Step 402, Processor 4 scans Target Identifying Information 8 and CDR 9 for the area code associated with Target Party 7 to determine the geographic location and time zone of Target Party 7. By acquiring the geographic location, time zone and time of day associated with Target Party 7, Processor 4 may be able to identify times that Originating Party 1 may contact Target Party 7. To identify times that Originating Party 1 may contact Target Party 7, Processor 4 may compare the time of day at the location associated with Target Party 7 with time restrictions associated with telemarketing call regulations.

Continuing with the current example, if the current time is Sunday between 9:00 am and 10:00 am in the time zone associated with Target Party 7, Originating Party 1 calls Target Party 7 at Step 404. In this example, this time period corresponds to Day 1; Time A in FIG. 4. If a connection is made with Target Party 7 (Yes, Step 406), then the Processor 4 considers Day 1; Time A a preferred time to contact Target Party 7 and stores all information regarding the call within Database 5 and Data Table 11 associated with Target Party 7 at Step 216. If there is no response from the Target Party 7 or an answering machine is played by Target Party 7, (No, Step 406), Distribution System 3 may receive an ISDN cause code and Processor 4 determines if the Target Party's 7 communication line is active or inactive based on the received ISDN cause code. Processor 4 attempts to match the ISDN cause code communicated by the Target Party's 7 line of communication with a list of active ISDN cause codes and inactive ISDN cause codes. If the received ISDN cause code found correlates to an inactive line, (No, Step 408) (e.g. Cause No. 1—unallocated number, Cause No. 22—number changed,) then the attempts to contact Target Party 7 via the phone number provided are terminated at Step 410, and the number is marked inactive in the Data Table 11 associated with Target Party 7.

If the received ISDN cause code correlates to an active line, (Yes, Step 408) (e.g. Cause No. 19—no answer from user) then the Originating Party 1 attempts to call Target Party 7 again at Step 412. It is to be understood by those skilled in the art that the second attempt at contacting Target Party 7 at Step 412 may take place immediately following the first attempt at Step 404, or may take place on another Day 1; Time A. It is at the discretion of the Originating Party 1 as to how often they contact Target Party 7 at said time, Day 1; Time A. If Time A is a lengthy amount of time, (e.g. fifteen minutes, half hour, hour, two hours, three hours), then it may be expected that Originating Party 1 attempts to connect to Target Party 7 multiple times within the same Day 1; Time A. Originating Party 1 may attempt to connect to Target Party 7 once a week, once a month, once a season, once a year within that specific time frame described herein as Day 1; Time A. Originating Party 1 may be restricted to a specific number of times that they may contact Target Party 7 based on telemarketing call regulations. This rule may be modified by the Originating Party 1, or may be set to comply with laws or regulations regarding the subject matter set by a governing body. The potential modifiers, regarding the amount of times an Originating Party 1 may legally contact Target Party 7, may determine the time needed to generate additional data for Data Table 11. For example, Processor 4 may be able to generate additional data instantaneously for the herein stated cell, labeled as Day 1; Time A, or it may take Processor 4 multiple minutes, hours, days, weeks, months and or years to generate additional data to fill the Data Table 11 associated with Target Party 7, depending on how often Originating Party 1 may contact Target Party 7.

Although only one attempt at contacting Target Party 7 may be sufficient to create a percentage for the herein stated cell, labeled as Day 1; Time A, additional data may help create more accurate percentages associated to the contact rate between Target Party 7 and Originating Party 1. These percentages stated above are created as a result of successful and failed attempts at contacting Target Party 7 at a specific time, stated herein as Day 1; Time A. In one non-limiting example, successful attempts are divided by total attempts to create a percentage number to quantify the overall success of the Originating Party 1 at contacting Target Party 7. Originating Party 1 may set a threshold that indicates what percentage of successful contact in a specific cell within Data Table 11 (e.g. 33%) is enough for Distribution System to deem that block of time within that cell is a preferred time to attempt to make contact with Target Party 7.

Successful contact attempts may be considered as attempts in which Target Party 7 either picks up the phone and is connected with Originating Party 1, or the ISDN cause code generated by Target Party 7's phone line indicates Target Party 7 is busy. In case the line is busy, although a connection was not made to Target Party 7, Processor 4 considers that Target Party 7 may be available to take a call at another Day 1; Time A within Data Table 11. In another aspect, at the discretion of Originating Party 1, a busy signal ISDN cause code may not be included in successful contact attempt percentage, or may be weighted less than Target Party 7 answering the call, or hold a lower priority of contact over contact rates in which a Target Party 7 answered the call.

Unsuccessful contact attempts may be considered as attempts in which Target Party 7 either does not pick up the phone and is not connected to Originating Party 1 or the ISDN cause code generated by Target Party 7's phone line indicates Target Party 7 is busy. In case the line is busy, although the ISDN cause code indicates Target Party 7 is in the location associated with Target Party 7's phone line, Processor 4 may consider that Target Party 7 may not be available to take a call at another Day 1; Time A. In another aspect, at the discretion of Originating Party 1, a busy signal ISDN cause code may not be included in unsuccessful contact attempt percentage, or may be weighted less than Target Party 7 missed the call, or hold a lower priority of contact over contact rates in which a Target Party 7 missed the call.

The next time Originating Party 1 intends to contact Target Party 7 during the time identified in cell, (labeled as Day 1; Time A) it is deemed as "Attempt 2" by the Processor 4. As discussed above, "Attempt 2" may take place on the same day as "Attempt 1" (e.g. 15 mins after "Attempt 1") or "Attempt 2" may take place after "Attempt 1" in Step 412 on another day associated with Day 1; Time A. If successful contact is made with Target Party 7, (Yes, Step 414) the Processor 4 considers Day 1; Time A a preferred time to call Target Party 7 and stores information regarding the call within Data Table 11 associated with Target Party 7 during Step 416. If there is no response from the Target Party 7 or an answering machine is played by Target Party 7, (No, Step 414), then the Processor 4 stores the data from the call within Database 5. The next time Originating Party 1 attempts to contact Target Party 7 during the time identified in the cell (labeled as Day 1; Time A), it is deemed as "Attempt 3" by the Processor 4 to contact Target Party 7. Originating Party 1 attempts to connect to Target Party 7 for a third time in Step 418. If successful contact is made with Target Party 7, (Yes, Step 420), Processor 4 considers Day 1; Time A a preferred time to call Target Party 7 and stores information regarding the call within Data Table 11 associated with Target Party 7 during Step 416. If there is no response from Target Party 7 or an answering machine is played by Target Party 7, (No, Step 420) then the Processor 4 stores the data from the call within Database 5 and Processor 4 considers Day 1; Time A a time that is not preferred to make contact with Target Party 7 during Step 422.

Once data from three contact attempts is stored within Data Table 11, Processor 4 may make presumptions in regards to preferred times to attempt to make contact with Target Party 7 based on the percentages associated with successful and failed attempts at contacting Target Party 7. For example, after Processor 4 considers Day 1; Time A a time that is not preferred to reach Target 7 in Step 422 (e.g. a success rate less than or equal to 33%), Distribution System 3 may decrease the percentage of calls directed to Target Party 7 on Day 1; Time A at Step 424. If Processor 4 considers Day 1; Time A a preferred time to reach Target 7 in Step 216 (e.g. success rates greater than 33%), Distribution System 3 may increase the percentage of calls directed to Target Party 7 on Day 1; Time A at Step 426. In this aspect, Distribution System 3 may direct fewer calls to Target Party 7 during a specific time, such as shown in Step 424, because the contact success rate at that time are very low, and could decrease the efficiency of the call center.

In one aspect described within the process flow in FIG. 5 and the example of Data Table 11 explained in FIG. 6, Processor 4 may implement a rule during Step 106 in FIG. 2 that indicates that when a predetermined percentage of attempts to contact Target Party 7 are successful, (e.g. such as 33%) then that specific data table cell, labeled for this example as Day 1; Time A, is considered a preferred time to contact Target Party 7. It should be understood by those skilled in the art that the rule explained above is only one of numerous possible examples. Originating Party 1 may deem any percentage a preferred time to attempt and make contact and apply it to the Processor 4.

The manner in which these rules are set and triggered may vary as well. For example, the aspects described within the process flow in FIG. 5 and the example of Data Table 11 explained in FIG. 6 describe the rule within Processor 4 deeming Day 1; Time A as a preferred time to call using a threshold percentage of 33%. Meaning, as soon as the data interpreted by Processor 4 indicates that Originating Party 7 makes successful contact with Target Party 7 at Day 1; Time A 33% of the time, it is deemed a preferred time to attempt to connect to Target Party 7.

In another aspect of the present disclosure (not shown), calls may be directed to Target Party 7 using a sliding scale of percentage data, rather than using predetermined percentages. In this example, Distribution System 3 may begin by equally distributing calls to all cells, each cell indicating a specific time and day in this example, within a Data Table 11. As soon as successful contact or unsuccessful contact call data is catalogued within Data Table 11, Distribution System 3 may allocate more calls to cells with higher successful contact rates, and allocate less calls to cells with lower successful contact rates.

In all the aspects described above, Processor 4 may make broader presumptions based on some of the data catalogued (not shown), for example; based on data such as if whether successful contact was made during a weekday or weekend, Distribution System 3 may allocate a higher percentage of calls directed to Target Party 7 based on whether it is weekday or weekend.

FIG. 6 is an example of a data table according to an aspect of the system and method of the present disclosure. Data Table 11 is generated as a result of Processor 4 processing data stored within Database 5 and may be generated dynamically from data gathered when Originating Party 1 attempts to contact Target Party 7. In one aspect, Data Table 11 may be segmented into seven columns, to indicate the number of days within a week. Data Table 11 may have numerous columns representing blocks of time, (e.g., days in a week, weeks, months, years, etc). Data Table 11 includes multiple rows, lettered Time A through Time G. These rows represent different smaller blocks of time, such as segments of time throughout any given day (e.g. minutes, hours, half hours, segmented portions of time throughout the standard day, day time, night time). There may be greater or fewer number of rows within a Data Table 11, each representing larger or smaller time periods. In the example displayed in FIG. 6, each segment of time lettered Time A through Time G represents an hour of time, starting at 9:00 to 10:00 am for Time A and ending with 3:00 pm to 4:00 pm for Time G. Shaded cells, such as Day 2; Time B indicate cells that have a percentage of successful contact rate higher than the predetermined threshold, here 33%, and therefore indicate preferred times for Originating Party 1 to contact Target Party 7. Data Table 11 may also formalize other data regarding Target Party 7, such as the time zone and regulations. These articles of information may modify Data Table 11 and limit the amount of cells within Data Table 11.

FIG. 7 shows a detailed view of the cell specified herein as Day 2; Time B, and equations used to determine the cells' status. In one aspect, Distribution System 3 may scan this individual cell within Data Table 11 to determine whether it is a candidate time to contact Target Party 7. In this example, in the individual cell within Data Table 11, (shown in FIG. 6) on Monday from 10:00 am to 11:00 am (labeled as Day 2; Time B) would be acknowledged by Distribution System 3 as having a successful contact rate of 53% because it is greater than the threshold of 33%. The 53% reflects the result of successful and failed attempts at contacting Target Party 7 at the specific time, stated herein as Day 2; Time B. The total number of successful attempts are divided by the total number of attempts (successful attempts+failed attempts) to create a percentage number to quantify the overall success of the Originating Party 1. Calls that are not connected because the phone line is busy may be considered as either a successful attempt, a failed attempt, or may be given a different numerical value, weighted to either emphasize or deemphasize their value within Data Table 11 (e.g. busy calls may be considered as ½ of a successful attempt). It is as the discretion of Originating Party 1 as to how much emphasis busy signals play in their Data Tables 11.

Processor 4 scans the Data Table 11 for the cell marked Day 2; Time B. It is to be understood by those skilled in the art that this action may take place during the time marked within the specified cell, labeled as Day 2; Time B (FIG. 6) or at a prior time and then scheduled accordingly into Call Order Queue 12. Once the cell is found, Distribution System 3 determines whether or not 10:00 am to 11:00 am on Monday, labeled Day 2; Time B is a preferred time to call Target Party 7. Based on the example rule set within Processor 4 described above, the predetermined threshold percentage was set to 33%, with that rule in mind, the cell marked as Day 2; Time B (FIG. 6) has a 53% chance of Originating Party 1 making contact with Target Party 7.

In this aspect, the system adds successfully connected attempts to busy attempts (where a busy attempt is weighted as ½ the value of a successful attempt), for a total of (45+16/2=53) 53 successful attempts. The number of successful attempts is then divided by the total number of attempts (45 successful attempts+16 busy attempts+39 failed attempts=100) resulting in a 53% successful contact rate. If the resulting percentage is greater than or equal to 33%, then the cell marked Day 2; Time B is deemed a preferred time to make contact with Target Party 7.

With this data found in the cell marked as Day 2; Time B, Distribution System 3 instructs Network Carrier 2 to connect Originating Party 1 to Target Party 7 via Physical/Virtual Connection 10 immediately, or at a later date scheduled by Distribution System 3 and placed into Call Order Queue 12. Data Table 11 also catalogues data such as the current status of the phone line attached to Target Party 7 and the Target Party 7 ID number to determine geographic location of the Target Party 7.

In one aspect of the present disclosure, Processor 4 may have access to data associated with social media websites, applications, and systems (e.g. Facebook, Twitter, Yelp, FourSquare, Myspace, Pandora). Social media tools usually depict or announce the current geographic location of the social media user. They also record times in which activities occur, such as photos taken, music listened to, videos watched, media posted, places or people tagged, messages sent, and duration of time using the social media system. Based on the social media activity, the time, and the location of the activity, Processor 4 may be able to determine times that may have higher successful contact rates, and ones that may have lower successful contact rates. For example, Processor 4 may determine that Target Party 7 was at home during time spent on a social media website, rather than using an application installed on a mobile computing device. This data could imply that Target Party 7 would be available to answer the landline or other preferred method of contact. This result would be allocated to Data Table 11 and could indicate times that may have higher successful contact rates. Processor 4 may also be able to determine a specific time or a portion of time in which the contact rates may be low, based primarily on the use of a social media application, installed on a mobile computing device. This could potentially indicate a time when Target Party 7 is not in the location associated to Target Party 7's landline or phone line in association with Target Party's 7 residence. Other social media activity such as posting a photo with a description such as "home" or "beach" could also indicate Target Party's 7 location and predict the likelihood of successful contact.

Figure 8:
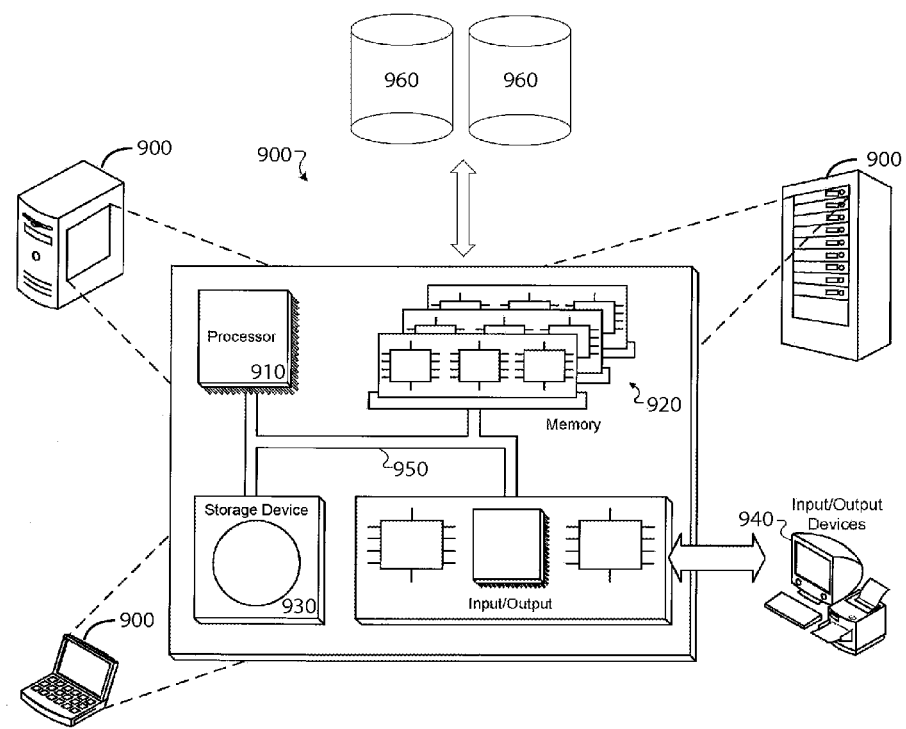
FIG. 8 is a diagram displaying a general purpose computer on which the system and method of the present disclosure may be implemented according to an aspect of present disclosure.

FIG. 8 shows a general purpose computer on which the system and method of the present disclosure may be implemented. The computer system 900 may execute at least some of the operations described above. Computer system 900 may include processor 910, memory 920, storage device 930, and input/output devices 940. Some or all of the components 910, 920, 930, and 940 may be interconnected via system bus 950. Processor 910 may be single or multi-threaded and may have one or more cores. Processor 910 may execute instructions, such as those stored in memory 920 or in storage device 930. Information may be received and output using one or more input/output devices 940.

Memory 920 may store information and may be a computer-readable medium, such as volatile or non-volatile memory. Storage device 930 may provide storage for system 900 and may be a computer-readable medium. In various aspects, storage device 930 may be a flash memory device, a floppy disk device, a hard disk device, an optical disk device, or a tape device.

Input/output devices 940 may provide input/output operations for system 900. Input/output devices 940 may include a keyboard, pointing device, and microphone. Input/output devices 940 may further include a display unit for displaying graphical user interfaces, speaker, and printer. External data, such as financial data, may be stored in accessible external databases 960.

The features described may be implemented in digital electronic circuitry, or in computer hardware, firmware, software, or in combinations thereof. The apparatus may be implemented in a computer program product tangibly embodied in an information carrier, e.g., in a machine-readable storage device or in a propagated signal, for execution by a programmable processor; and method steps may be performed by a programmable processor executing a program of instructions to perform functions of the described implementations by operating on input data and generating output.

The described features may be implemented in one or more computer programs that are executable on a programmable system including at least one programmable processor coupled to receive data and instructions from, and to transmit data and instructions to, a data storage system, at least one input device, and at least one output device. A computer program may include set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors of any kind of computer. Generally, a processor may receive instructions and data from a read only memory or a random access memory or both. Such a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable, disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks may include, e.g., a LAN, a WAN, and the computers and networks forming the Internet.

The computer system may include clients and servers. A client and server may be remote from each other and interact through a network, such as the described one. The relationship of client and server may arise by virtue of computer programs running on the respective computers and having a client-server relationship to each other.

Numerous additional modifications and variations of the present disclosure are possible in view of the above teachings. It is therefore to be understood that within the scope of the appended claims, the present disclosure may be practiced other than as specifically described herein.

What is claimed is:

1. A computer system for controlling calls to a call target, comprising:
    a processor in communication with non-volatile memory, the non-volatile memory executing code comprising:
    code for receiving call target information relating to the call target;
    code for accessing a database and retrieving a contact rate for a specific time of day for the call target, the contact rate determined based on information relating to calls to the call target on one or more prior days at a time of day similar to the specified time of day;
    code for placing a call target identifier in a queue indicating the call target will be called during the specified time of day, when the specified time of day for the call target has a contact rate greater than a threshold rate;
    code for placing a call to the call target during the specified time of day; and
    code for updating the contact rate based on an outcome of the call.

2. The computer system of claim 1, where the contact rate is based on number of calls connected and number of unanswered calls.

3. The computer system of claim 1, where the contact rate is based on number of calls connected, number of calls resulting in busy signals, and number of unanswered calls.

4. The computer system of claim 1, where the code for updating the contact rate increases the contact rate when the call is answered.

5. The computer system of claim 1, where the code for updating the contact rate increases the contact rate when the call is answered or a busy signal is received.

6. The computer system of claim 1, where the code for updating the contact rate increases the contact rate when the call is answered and decreased the contact rate when the call is unanswered.

7. The computer system of claim 1, further comprising:
    code for updating the database entry of the call target when the call indicates the telephone number of the call target is or is cot an activated telephone number; and
    code for accessing the database entry of the call target and placing the call only when the call target is activated.

8. The computer system of claim 7, further comprising:
    code for determining the telephone number of the call target is inactive based on ISDN codes.

9. The computer system of claim 1, further comprising code for performing a regulatory check before placing the call to the call target and placing the call when no regulatory violation is found.

10. The computer system of claim 1, where the regulatory violation is a do not call list violation.

11. The computer system of claim 1, where the regulatory violation relates to times of day when calls may not be placed.

12. The computer system of claim 1, where the regulatory violation relates to a number of times the target may be called in a time period.

13. The computer system of claim 1, further comprising code for performing a regulatory check before placing the call to the call target and placing the call when a regulatory violation and an applicable regulatory violation exception are found.

14. The computer system of claim 1, where the threshold rate is 33%.

15. A computer system for controlling calls to a call target, comprising:
    a processor in communication with non-volatile memory, the non-volatile memory executing code comprising:
    code for receiving call target information relating to the call target;
    code for determining whether the telephone number associated with the call target is an activated telephone number;
    code for accessing a database and retrieving a contact rate for a time period for the call target;
    code for performing a regulatory check for the call target;
    code for placing a call to the active telephone number of the call target during the time period, when the time period for the call target has a contact rate greater than a threshold rate and when no regulatory violation is found; and
    code for updating the contact rate based on an outcome of the call.

* * * * *